US011511223B2

(12) United States Patent
Decugniere

(10) Patent No.: US 11,511,223 B2
(45) Date of Patent: Nov. 29, 2022

(54) SYSTEM COMPRISING A CONNECTOR FOR COUPLING TO A FLUID FILTER ELEMENT, FLUID FILTER ELEMENT, AND PROCESS FOR PRODUCING SAME

(71) Applicant: Donaldson Company, Inc., Bloomington, MN (US)

(72) Inventor: Antoine Decugniere, Woluwe Saint-Pierre (BE)

(73) Assignee: Donaldson Company, Inc., Bloomington, MN (US)

( * ) Notice: Subject to any disclaimer, the term of this patent is extended or adjusted under 35 U.S.C. 154(b) by 159 days.

(21) Appl. No.: 16/495,957

(22) PCT Filed: Mar. 20, 2018

(86) PCT No.: PCT/US2018/023358
§ 371 (c)(1),
(2) Date: Sep. 20, 2019

(87) PCT Pub. No.: WO2018/175438
PCT Pub. Date: Sep. 27, 2018

(65) Prior Publication Data
US 2020/0139288 A1     May 7, 2020

Related U.S. Application Data

(60) Provisional application No. 62/473,806, filed on Mar. 20, 2017.

(51) Int. Cl.
*B01D 46/24*     (2006.01)
*B01D 46/00*     (2022.01)

(52) U.S. Cl.
CPC ..... *B01D 46/2414* (2013.01); *B01D 46/0004* (2013.01); *B01D 46/0005* (2013.01);
(Continued)

(58) Field of Classification Search
CPC ............ B01D 46/2414; B01D 46/0004; B01D 46/0005; B01D 2265/022;
(Continued)

(56) References Cited

U.S. PATENT DOCUMENTS 6,187,191 B1 *   2/2001   Koivula ................ B01D 29/111
                                                     210/DIG. 17
2009/0242470 A1   10/2009  Muenkel et al.
(Continued)

FOREIGN PATENT DOCUMENTS

BY          9386 C1      6/2007
DE    102004029641 A1    1/2006
(Continued)

OTHER PUBLICATIONS

International Search Report and Written Opinion for PCT/US2018/023358, dated Aug. 24, 2018.

*Primary Examiner* — Robert A Hopkins
*Assistant Examiner* — Qianping He
(74) *Attorney, Agent, or Firm* — Merchant & Gould P.C.

(57) ABSTRACT

The present disclosure is directed to a new quick-connect, bayonet-type coupling arrangement for use with connecting a filter cartridge or element to a fluid-consuming machine. Advantageously, the features of the coupling arrangement can be provided while simultaneously maintaining backward compatibility with screw-thread based systems by modifying the screw thread on the end cap so as to include judicially arranged non-interfering segments. Accordingly, the disclosed fluid filter elements can not only be installed on systems according to the present disclosure but also on prior-art systems presenting a thread-based connector.

8 Claims, 12 Drawing Sheets

(52) U.S. Cl.
CPC .. *B01D 2265/022* (2013.01); *B01D 2265/026* (2013.01); *B01D 2265/029* (2013.01)

(58) Field of Classification Search
CPC ........ B01D 2265/026; B01D 2265/029; B01D 46/0021; B01D 46/0057; B01D 46/0067; B01D 46/0068; B01D 46/02; B01D 46/023; B01D 46/04; B01D 46/2411; B01D 46/42; B01D 46/521; B01D 2275/206; B01D 2275/207; B01D 2275/208
USPC .......................................................... 55/490
See application file for complete search history.

(56) References Cited

U.S. PATENT DOCUMENTS

| | | | |
|---|---|---|---|
| 2010/0181243 A1 | 7/2010 | Dworatzek et al. | |
| 2014/0217001 A1* | 8/2014 | Vercammen | B01D 29/00 210/232 |

FOREIGN PATENT DOCUMENTS

| | | | | |
|---|---|---|---|---|
| DE | 202006011990 U1 | 12/2007 | | |
| EA | 011777 B1 | 6/2009 | | |
| EP | 1438997 A1 | 7/2004 | | |
| EP | 2108424 A1 | 10/2009 | | |
| EP | 2764901 A1 | 8/2014 | | |
| RU | 2262021 C2 | 10/2005 | | |
| WO | 0220132 A2 | 3/2002 | | |
| WO | 2006084282 A2 | 8/2006 | | |
| WO | 2007/085427 A1 | 8/2007 | | |
| WO | 2014/088600 A1 | 6/2014 | | |
| WO | WO-2014088600 A1 * | 6/2014 | | F16B 39/30 |
| WO | 2015042390 A2 | 3/2015 | | |

* cited by examiner

SYSTEM COMPRISING A CONNECTOR FOR COUPLING TO A FLUID FILTER ELEMENT, FLUID FILTER ELEMENT, AND PROCESS FOR PRODUCING SAME

RELATED APPLICATIONS

This application is a National Stage Application of PCT International Application No. PCT/US2018/023358, filed on Mar. 20, 0218, which claims the benefit of priority to U.S. Provisional Application Ser. No. 62/473,806, filed on Mar. 20, 2017, which applications are incorporated herein by reference. To the extent appropriate, a claim of priority is made to each of the above disclosed applications.

FIELD OF THE INVENTION

The present invention pertains to a system comprising a connector for coupling to a fluid filter element, a fluid filter element, and a process for producing same. The system may in particular be an air filtering subsystem presenting a connector for receiving an exchangeable air filter element.

BACKGROUND

Systems that need a supply of filtered air for their operation, such as internal combustion engines, and systems that tend to cause air to be loaded with particulate impurities during their operation, such as drills and earth moving equipment, typically present a connector for receiving an exchangeable air filter element. Known connectors are of the male screw-thread type, requiring a filter element having a female screw-thread, or vice versa, the filter element having to be screwed on by means of multiple full rotations of the element. These systems may be of the top-load or the bottom-load type.

There is a need for a connection system that allows for a less cumbersome installation process, while retaining backward compatibility with existing equipment.

SUMMARY

According to an aspect of the present invention, there is provided a system comprising a connector for coupling to a fluid filter element, the fluid filter element comprising an end cap provided with a first coupling means, the connector comprising a second coupling means; wherein said first coupling means comprises a substantially cylindrical bore presenting an inner threading pattern composed of a number of threaded segments interrupted by non-interfering segments, and said second coupling means comprises a substantially cylindrical protrusion presenting an outer threading pattern composed of a number of threaded segments interrupted by non-threaded segments, or vice versa; wherein said non-threaded segments are distributed along the circumference of said substantially cylindrical protrusion so as to only allow said substantially cylindrical bore to slide over said substantially cylindrical protrusion without interference between said threaded segments of said substantially cylindrical protrusion and said threaded segments of said substantially cylindrical bore when said substantially cylindrical bore and said substantially cylindrical protrusion are in one of a set of predetermined relative angular position ranges; and wherein said threaded segments of said substantially cylindrical protrusion are arranged to allow engagement with said threaded segments of said substantially cylindrical bore, when said substantially cylindrical bore has been slid over said substantially cylindrical protrusion, by means of a rotation.

The present invention is based inter alia on the insight of the inventor that the benefits of bayonet couplers (notably, the faster attachment/detachment than for screw-on couplers) can be achieved while maintaining backward compatibility with screw-thread based systems by modifying the screw thread on the end cap so as to include judicially arranged non-interfering segments. Accordingly, fluid filter elements according to the present invention may be installed on systems according to the present invention but also on prior-art systems presenting a thread-based connector. The term "fluid filter" is used herein to include gas (including air) and liquid filters.

The non-interfering segments may for example be segments devoid of thread (i.e., presenting an interruption in the thread pattern) or segments that are radially displaced relative to the remainder of the end cap so as to be physically unable to engage with the thread on the relevant threaded segments of the connector according to the present invention.

The "predetermined relative angular position ranges" may consist of one or more particular angular positions (and a specific range around this position or these positions) in which the non-interfering segments are in such a positional relationship to the threaded segments of the protrusion that the end cap can be slid over the protrusion. Depending on the degree of symmetry of the end cap and the connector, there may be one or more angular positions that fulfill this condition.

Preferably, the engagement is obtained by means of a rotation of no more than 180°.

Thus, in a first variant of the system according to the present invention, the first coupling means comprises a substantially cylindrical protrusion presenting an outer threading pattern composed of a number of threaded segments interrupted by non-threaded segments, and the second coupling means comprises a substantially cylindrical bore presenting an inner threading pattern composed of a number of threaded segments interrupted by non-interfering segments; wherein said non-threaded segments are distributed along the circumference of said cylindrical protrusion so as to only allow said substantially cylindrical bore of said connector to slide over said substantially cylindrical protrusion without interference between said threaded segments of said substantially cylindrical protrusion and said threaded segments of said substantially cylindrical bore when said substantially cylindrical bore and said substantially cylindrical protrusion are in one of a set of predetermined relative angular position ranges; and wherein said threaded segments of said substantially cylindrical protrusion are arranged to allow engagement with said threaded segments of said substantially cylindrical bore, when said substantially cylindrical bore has been slid over said substantially cylindrical protrusion, by means of a rotation.

Where reference is made to the substantially cylindrical bore of the connector "sliding over" the substantially cylindrical protrusion of the fluid filter element, this must be understood to cover a relative motion between the connector and the fluid filter element so as to cause the two parts to approach each other and engage which each other. This relative motion may likewise be expressed as the substantially cylindrical protrusion of the fluid filter element "sliding into" the substantially cylindrical bore of the connector.

Alternatively, in a second variant of the system according to the present invention, the first coupling means comprises a substantially cylindrical bore presenting an inner threading pattern composed of a number of threaded segments interrupted by non-interfering segments, and the second coupling means comprises a substantially cylindrical protrusion presenting an outer threading pattern composed of a number of threaded segments interrupted by non-threaded segments; wherein said non-threaded segments are distributed along the circumference of said cylindrical protrusion so as to only allow said substantially cylindrical bore of said fluid filter element to slide over said substantially cylindrical protrusion without interference between said threaded segments of said substantially cylindrical protrusion and said threaded segments of said substantially cylindrical bore when said substantially cylindrical bore and said substantially cylindrical protrusion are in one of a set of predetermined relative angular position ranges; and wherein said threaded segments of said substantially cylindrical protrusion are arranged to allow engagement with said threaded segments of said substantially cylindrical bore, when said substantially cylindrical bore has been slid over said substantially cylindrical protrusion, by means of a rotation.

In an embodiment of the system according to the present invention, the substantially cylindrical protrusion is provided with a number of circumferential lobes.

In a particular embodiment, the circumferential lobes are arranged so as to present no rotational symmetry.

In another particular embodiment, the circumferential lobes are arranged so as to present substantial diametral symmetry.

The term "substantial diametral symmetry" refers to true symmetry in the geometric sense, or an arrangement that deviates sufficiently little from true symmetry to appear symmetric to the human eye. The arrangement has the advantage of allowing a human user of the system to visually determine the correct orientation of the parts during assembly of the system (i.e., when the connector is attached to the system, whereby, in a multiple-filter system, it is preferred to install all connectors in substantially the same orientation), and, in use, to determine the proper relative orientation of the parts to initiate the engagement between the protrusion and the bore.

In an embodiment of the system according to the present invention, the threaded segments of the substantially cylindrical protrusion are provided at their protruding end with a length of unthreaded mantle having a diameter corresponding to the major diameter of the threaded segments and a length exceeding the thread pitch of the threaded segments, so as to inhibit the screwing on of an element presenting a thread in the axial range defined by the length of unthreaded mantle.

The diameter of the length of unthreaded mantle preferably has a diameter that is not inferior to, or even superior to, the major diameter of the threaded segments.

It is an advantage of this embodiment that the accidental screwing-on of older screw-thread based filter elements onto the connector of the system according to the present invention, which might result in a system malfunction, can be prevented.

The length of unthreaded mantle may be flush with the outer thread circumference of the threaded segments. It may in particular prevent the screwing on of a continuously threaded bore.

In an embodiment, the system of the present invention further comprises the fluid filter element comprising the end cap, provided with the first coupling means, wherein said first coupling means is detachably engaged with said second coupling means.

Accordingly, the present patent application also covers a system having one or more connectors for receiving fluid filter elements, having corresponding fluid filter element coupled thereto.

According to an aspect of the present invention, there is provided a connector for use in the system of any of the preceding claims, the connector comprising a substantially cylindrical protrusion presenting an outer threading pattern composed of a number of threaded segments interrupted by non-threaded segments, the connector being arranged for cooperating with an end cap of a fluid filter element, said end cap comprising a substantially cylindrical bore presenting an inner threading pattern composed of a number of threaded segments interrupted by non-interfering segments; wherein said non-threaded segments are distributed along the circumference of said cylindrical protrusion so as to only allow said substantially cylindrical bore of said fluid filter element to slide over said substantially cylindrical protrusion without interference between said threaded segments of said substantially cylindrical protrusion and said threaded segments of said substantially cylindrical bore when said substantially cylindrical bore and said substantially cylindrical protrusion are in one of a set of predetermined relative angular position ranges; and wherein said threaded segments of said substantially cylindrical protrusion are arranged to allow engagement with said threaded segments of said substantially cylindrical bore, when said substantially cylindrical bore has been slid over said substantially cylindrical protrusion, by means of a rotation.

According to an aspect of the present invention, there is provided a connector for use in the system of any of the preceding claims, the connector a substantially cylindrical bore presenting an inner threading pattern composed of a number of threaded segments interrupted by non-interfering segments; the connector being arranged for cooperating with an end cap of a fluid filter element, said end cap comprising a substantially cylindrical protrusion presenting an outer threading pattern composed of a number of threaded segments interrupted by non-threaded segments, wherein said non-threaded segments are distributed along the circumference of said cylindrical protrusion so as to only allow said substantially cylindrical bore of said fluid filter element to slide over said substantially cylindrical protrusion without interference between said threaded segments of said substantially cylindrical protrusion and said threaded segments of said substantially cylindrical bore when said substantially cylindrical bore and said substantially cylindrical protrusion are in one of a set of predetermined relative angular position ranges; and wherein said threaded segments of said substantially cylindrical protrusion are arranged to allow engagement with said threaded segments of said substantially cylindrical bore, when said substantially cylindrical bore has been slid over said substantially cylindrical protrusion, by means of a rotation.

According to an aspect of the present invention, there is provided a fluid filter element for use in the fluid filter system as described above, the fluid filter element comprising an end cap adapted to be coupled to the connector mounted on a machine so as to allow fluid to be exchanged between the filter element and the machine, wherein the end cap is provided with the substantially cylindrical bore presenting an inner threading pattern composed of a number of threaded segments interrupted by non-interfering segments, the non-interfering segments remaining outside the space defined by the major diameter of the threaded segments;

wherein the non-interfering segments are distributed along the circumference of the cylindrical bore so as to provide no rotational symmetry.

As indicated above, the non-interfering segments may for example be segments devoid of thread (i.e., presenting an interruption in the thread pattern) or segments that are radially displaced relative to the remainder of the end cap so as to be physically unable to engage with the thread on the relevant threaded segments of the connector according to the present invention.

According to an aspect of the present invention, there is provided a fluid filter element for use in the system as described above, the fluid filter element comprising an end cap adapted to be coupled to said connector mounted on a machine so as to allow fluid to be exchanged between said filter element and said machine, wherein said end cap is provided with said substantially cylindrical protrusion presenting an outer threading pattern composed of a number of threaded segments interrupted by non-threaded segments.

This aspect of the disclosure represents an inversion of the roles of the first coupling means and the second coupling means, with the same technical advantages.

In an embodiment, the fluid filter element according to the present invention comprises a filter medium arranged around an axial liner, and the end cap is attached to or of one part with the liner.

If the liner is a rigid, axial liner, the torque required to engage the end cap with the connector may be applied by the end user at the distal end of the liner, which facilitates installation in particular when multiple fluid filter elements are to be installed close to each other.

In an embodiment, the fluid filter element according to the present invention comprises a snap-fit element arranged to maintain engagement between said substantially cylindrical protrusion and said substantially cylindrical bore when full rotational engagement has been achieved.

It is an advantage of this embodiment that the filter element will not easily get disengaged as a result of vibrations of the machine in which it is installed.

According to an aspect of the present invention, there is provided a process for producing a fluid filter element as described above, the process comprising: pressing a metal disc with a mandrel in one or more steps so as to obtain a first end cap with a bore; press rolling the first end cap with a threaded mandrel or laterally pressing the first end cap with a threaded die so as to provide the first end cap with a continuous or segmented inner thread; and assembling the first end cap with a liner, a filter medium, and a second end cap so as to obtain the fluid filter element; wherein the pressing of the metal disc results in a substantially cylindrical shape having a number of lobes that, after the press rolling or lateral pressing step, form the non-interfering segments, while a remainder of the shape form the threaded segments.

The inventor has found that this is a particularly advantageous manner to produce the fluid filter element according to the present invention, requiring minimal adaptations to standard metal working techniques.

The invention also pertains to a metal end cap obtained by the process described above.

According to an aspect of the present invention, there is provided an end cap assembly for a fluid filter element, the end cap assembly comprising an end cap and an inner part connected thereto; wherein the end cap is provided with a substantially cylindrical bore presenting an inner threading pattern composed of a number of threaded segments interrupted by non-interfering segments, the non-interfering segments remaining outside the space defined by the major diameter of the threaded segments and being distributed along the circumference of the cylindrical bore so as to provide no rotational symmetry; wherein the inner part has a top surface which acts, when the fluid filter element is coupled to a system, as a grommet that engages with a corresponding surface on a system inlet of the system; and wherein a lower portion of the inner part forms a tube-shaped outlet channel.

In an embodiment of the end cap assembly according to the present invention, at least one of the end cap and the inner part is made of plastic.

In an embodiment of the end cap assembly according to the present invention, the top surface is provided with bumps or catches.

In an embodiment of the end cap assembly according to the present invention, a thread groove has been skipped to create a ridge, arranged to avoid rotating the end cap in the wrong direction.

In an embodiment of the end cap assembly according to the present invention, a flexible finger is provided to engage with a corresponding ridge on the protrusion on a connector of the system in a snap-fitting manner.

In an embodiment of the end cap assembly according to the present invention, a lower part of the end cap presents a circumferential groove to accommodate a sealing means to sealingly engage with the housing of a fluid filter element onto which the end cap is mounted.

According to an aspect of the invention, an air filter cartridge for connection with a fluid-consuming machine is presented, wherein the air filter cartridge includes an extension of filtration media, an axial liner supporting the media, an end cap operatively connected to the axial liner wherein the end cap (200) includes a sidewall defining a central opening, a seal supported by the end cap, and a connection arrangement configured for connection with a cooperatively shaped connector of the fluid-consuming machine. The connection arrangement can include a plurality of threaded segments interrupted by non-interfering segments, wherein the non-interfering segments are oriented radially beyond a circumference defined by a major diameter of the threaded segments and are distributed along the end cap sidewall.

In an embodiment of the filter cartridge according to the present invention, the end cap further includes a flange extending radially from the circumferential sidewall, wherein the seal is supported by the flange.

In an embodiment of the filter cartridge according to the present invention, the seal includes an axially facing sealing surface.

In an embodiment of the filter cartridge according to the present invention, the plurality of threaded segments are presented on a radially inward side of the end cap sidewall.

In an embodiment of the filter cartridge according to the present invention, the end cap is formed from a polymeric material.

In an embodiment of the filter cartridge according to the present invention, the seal is formed from a rubber or polyurethane material.

In an embodiment of the filter cartridge according to the present invention, the plurality of threaded segments are arranged so as to present rotational asymmetry.

In an embodiment of the filter cartridge according to the present invention, the plurality of threaded segments are arranged so as to present diametral symmetry.

In an embodiment of the filter cartridge according to the present invention, the threaded segments each include a plurality of axially spaced threaded portions.

It is an advantage of embodiments of the end cap assembly according to the present invention, that it provides a convenient way to produce a fluid filter element having the advantages of the system described above.

BRIEF DESCRIPTION OF THE FIGURES

These and other features and advantages of embodiments of the present invention will be described in more detail with reference to the attached drawings, in which.

DESCRIPTION OF EMBODIMENTS

Throughout the description, aspects of the fluid filter element according to the present invention may be described by reference to an air filter element in a bottom-load system, wherein the filter element has a substantially cylindrical bore in its end cap and the connector presents a substantially cylindrical protrusion. This is done without loss of generality, as the technical effects and advantages of the features of the present invention apply in the same manner to other types of fluid filter elements, including fluid filter elements where the position of the bore and the protrusion are switched, unless indicated otherwise.

Figure 1A:
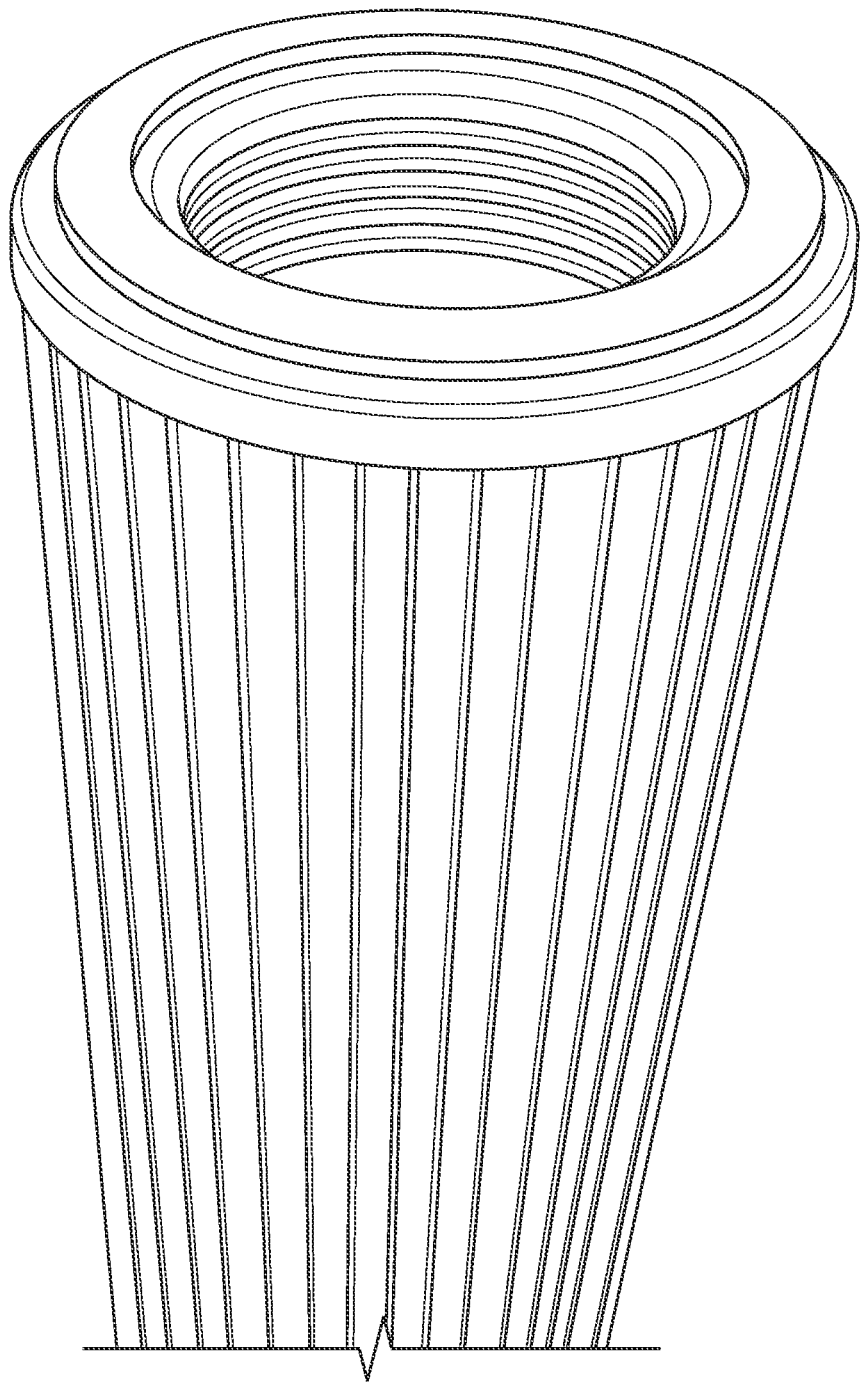
FIG. 1A is a photograph of a known air filter element.

FIG. 1A is a photograph of a known air filter element. It comprises a pleated filter medium arranged around an axial liner (not shown), the top end of which presents an open end cap with a cylindrical bore having a female screw thread. An axial seal is provided on the end cap. The end cap may be coupled to a system presenting a cylindrical protrusion having a corresponding male screw thread. The full engagement of the axial seal against the flange of the connector may require a substantial number (e.g. 6) of full rotations of the air filter element, which makes the replacement of air filter elements a rather cumbersome operation.

Embodiments of the present invention overcome this disadvantage by providing a bayonet-type engagement between the connector on the system and the fluid filter element, while maintaining compatibility between the fluid filter element of the invention and legacy systems (one-way backward compatibility).

Figure 1B:
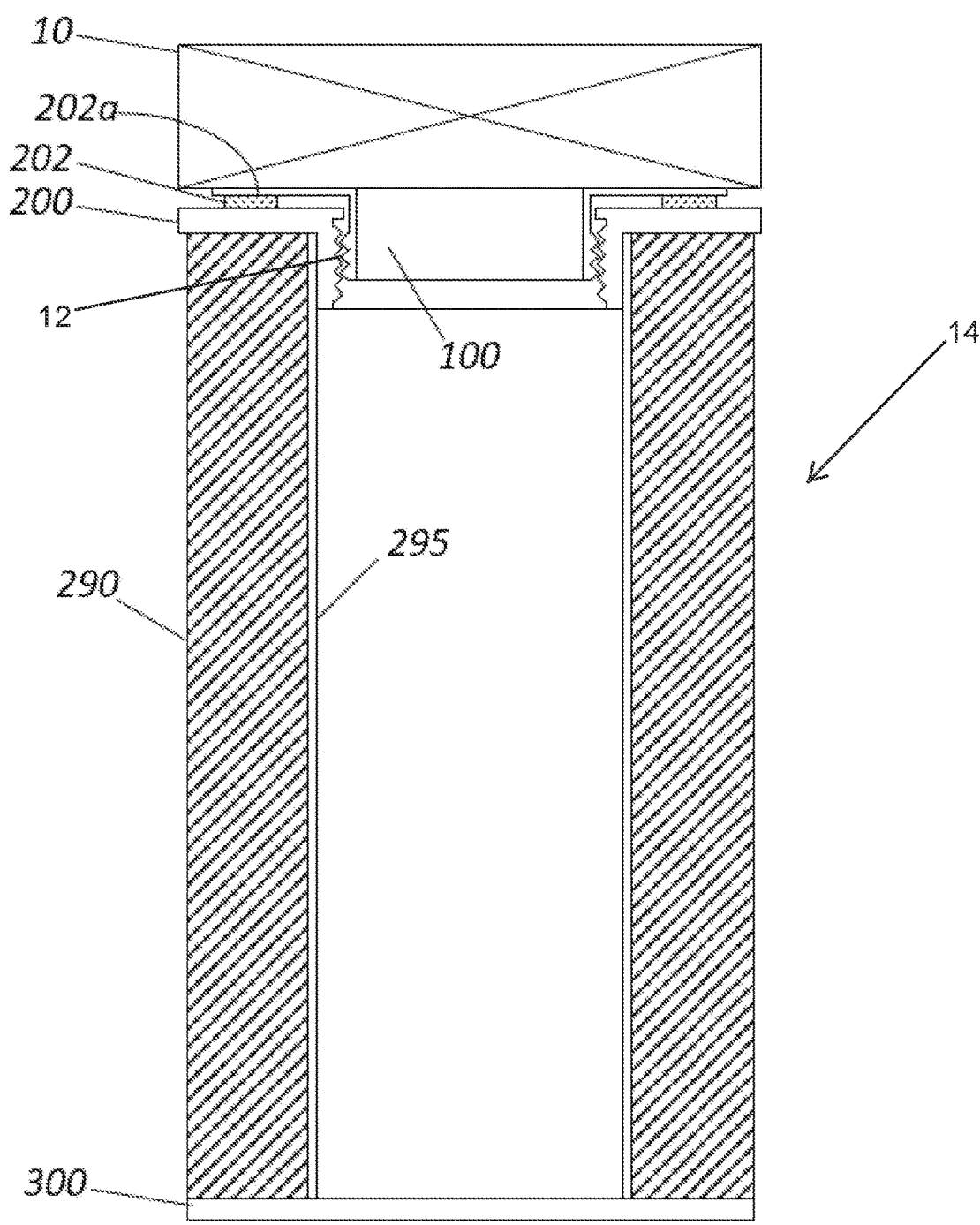
FIG. 1B is a schematic representation of an air cleaning system utilizing a connection system as may be present in an embodiment of the system according to the present invention.

FIG. 1B shows an air cleaning system 10 including a connection arrangement 12 for connecting a filter cartridge 14 to a fluid-consuming device, such as an air intake of an internal combustion engine. As explained in further detail below, the connection arrangement 12 may include an end cap disposed 200 disposed on the filter cartridge 14 that interacts with a correspondingly shaped connector 100 disposed on either the fluid consuming device or a housing (not shown) within which the filter cartridge 14 is disposed. In some examples, the filter cartridge 14 can also be provided with an end cap 300 opposite end cap 200. In the embodiment shown at FIG. 1B, the end cap 300 is a closed end cap.

Figure 2:
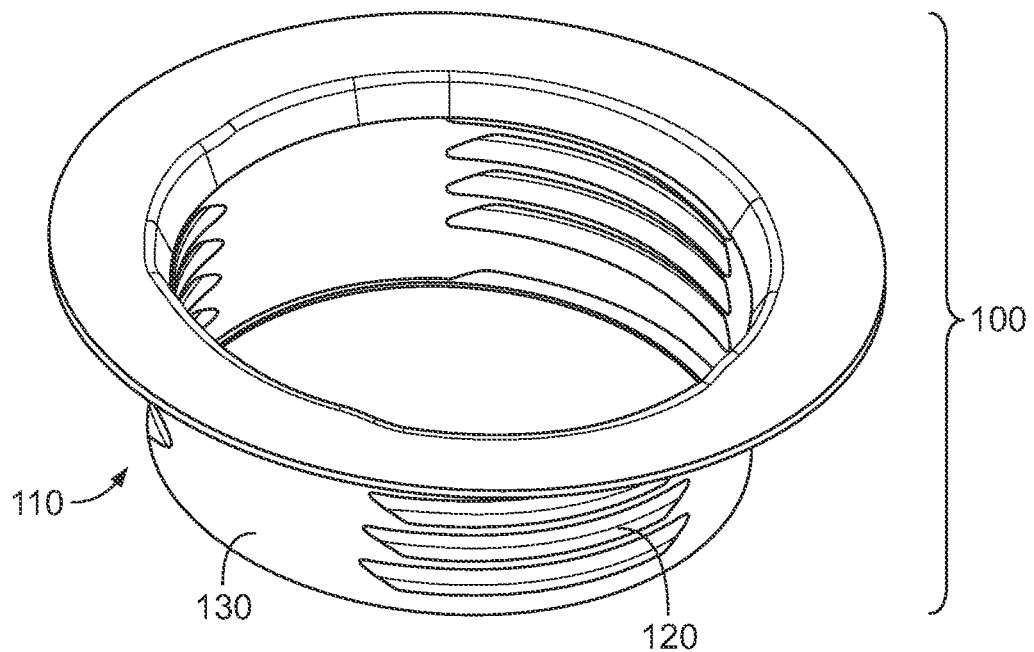
FIG. 2 illustrates a connector as may be present in an embodiment of the system according to the present invention.

FIG. 2 illustrates a connector 100 as may be present in an embodiment of the system according to the present invention, for coupling to a fluid filter element. Without loss of generality, the connector 100 is shown in an orientation where the flange, which is part of the system or attached to the system (for example by spot welding), is shown as the top and the protrusion 100 that receives the fluid filter element is shown as the bottom. This orientation is merely chosen for illustrative purposes. The system may also function in other orientations without departing from the concepts presented herein.

The connector 100 comprises a substantially cylindrical protrusion 110 presenting an outer threading pattern composed of a number of threaded segments 120 interrupted by non-threaded segments 130.

The non-threaded segments 130 are distributed along the circumference of the cylindrical protrusion 110 so as to allow a substantially cylindrical bore of a fluid filter element (described below) to slide over the substantially cylindrical protrusion 110 without interference between the threaded segments 120 of the substantially cylindrical protrusion 110 and the threaded segments of the substantially cylindrical bore, only when the substantially cylindrical bore and the substantially cylindrical protrusion 110 are in one of a set of predetermined relative angular position ranges (it is here noted again that the set may consist of just a single appropriate relative angular position range). The ranges may span an angle of up to 22.5° on each side of the central position, preferably up to 10° on each side of the central position, more preferably up to 5° on each side of the central position, most preferably up to 2.5° on each side of the central position.

The threaded segments 120 of the substantially cylindrical protrusion 110 are arranged to allow engagement with the threaded segments of the substantially cylindrical bore, when the substantially cylindrical bore has been slid over the substantially cylindrical protrusion 110, by means of a rotation. The extent of the rotation required to obtain engagement depends on the angular extent of the threaded portions. It is preferably 180° or less (e.g., if a single threaded segment 120 extends over substantially half of the circumference of the substantially cylindrical protrusion 110), more preferably 90° or less (e.g., if a pair of threaded segments 120 extends over substantially a quarter of the circumference of the substantially cylindrical protrusion 110 each), possibly even 60°, 45°, 30°, or less.

Figure 3:
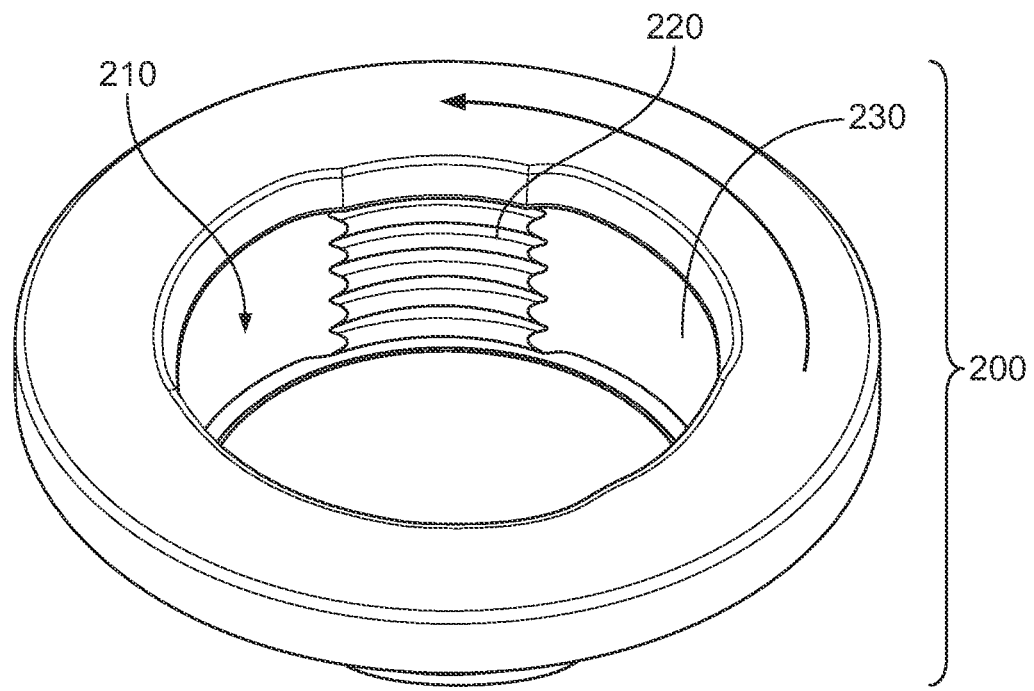
FIG. 3 illustrates an end cap for a corresponding fluid filter element.

FIG. 3 illustrates an end cap 200 for a corresponding fluid filter element. The end cap 200 is provided with a substantially cylindrical bore 210 presenting an inner threading pattern composed of a number of threaded segments 220 interrupted by non-interfering segments 230. In one aspect, the bore 210, which has a tubular shape that may or may not be a cylindrical, can be characterized as a sidewall 210 defining a central opening.

As the threading pattern is intended to engage with the threads of the substantially cylindrical protrusion 110 described above, and as this coupling must be capable of supporting the weight of the fluid filter element (in a "suspended" arrangement), the number of threads and their depth is selected in function of the size of the fluid filter element and the according weight to be supported. In industrial contexts, the fluid filter elements may have exemplary diameters ranging from 120 mm to 324 mm and exemplary lengths ranging from 600 mm to 2000 mm or more.

The top flange of the end cap 200 may be provided with a seal or gasket 202 to provide axial sealing between the (clean) inside of the fluid filter element and the system on the one hand, and the (dirty) outside of the fluid filter element on the other hand. The characteristics of this seal or gasket 202 may be selected in function of the requirements of the application, and the type of fluid to be filtered. Thus, in embodiments for use in the context of industrial air filtration, a simple ring of a low-friction foam material may suffice, while other applications may require a compressed or deflected elastomer gasket (e.g. made of rubber or polyurethane). In one aspect, the seal or gasket 202 can have an axially facing seal surface 202a such that an axial seal (i.e. seals in a plane orthogonal to the longitudinal axis X of the filter cartridge) is formed between the seal or gasket 202 and the connector 100.

It is clearly visible that in the case illustrated in FIGS. 2 and 3, the bore 210 of the end cap 200 can be made to slide over the substantially cylindrical protrusion 110 (upwards, in the orientation chosen for FIGS. 2 and 3), provided that the non-interfering segments 230 of the end cap 200 are angularly aligned with the threaded segments 120 of the substantially cylindrical protrusion 110. It can also be easily understood that after the end cap 200 has been slid over the substantially cylindrical protrusion 110, the threaded segments 220 of the end cap 200 can be made to engage with the threaded segments 120 of the substantially cylindrical protrusion 110 by turning the end cap 200 approximately 60° in the direction indicated by the arrow.

Advantageously, the presence of non-interfering segments 230 on the substantially cylindrical bore 210 does not preclude the latter from being screwed onto a prior-art protrusion with a continuous thread, thus achieving one-way backward compatibility.

While the concept of the present invention has been illustrated in FIGS. 2 and 3 with reference to a design in which the non-interfering segments 230 of the substantially cylindrical bore 210 are obtained by an interruption of the thread, the invention is not limited thereto.

Figure 4:
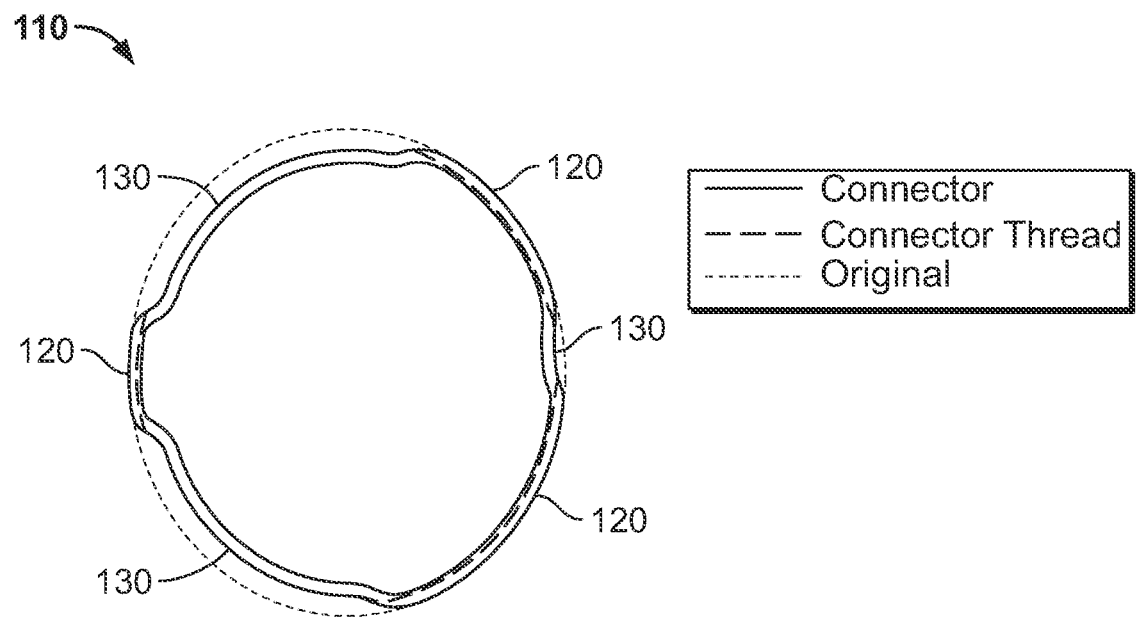
FIG. 4 schematically illustrates in cross-section an embodiment of the system according to the present invention, in which the substantially cylindrical protrusion is provided with a number of circumferential lobes.

In an embodiment of the system according to the present invention, schematically illustrated in cross-section in FIG. 4, the substantially cylindrical protrusion 110 is provided with a number of circumferential lobes.

The radially outwardly protruding lobes of the substantially cylindrical protrusion 110 are the portions where the mantle follows the original cylindrical outline (shown in dotted lines) and these lobes form the threaded segments 120 of the connector 100. Conversely, the portions between the lobes (the dents or inwardly extending recesses in the cylinder) have no threading (or at most very shallow, non-functional threading), and form the non-threaded segments 130 of the connector.

Figure 5:
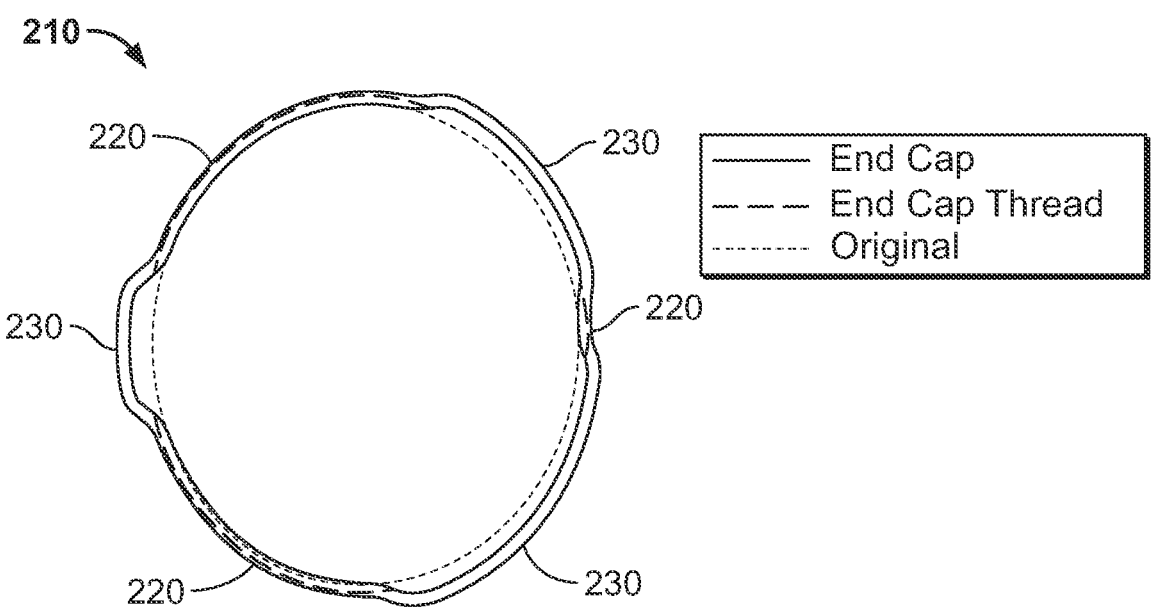
FIG. 5 schematically illustrates in cross-section an end cap for a corresponding fluid filter element.

A corresponding substantially cylindrical bore 210, schematically illustrated in cross-section in FIG. 5, is likewise provided with circumferential lobes, having a complementary function.

The radially outwardly protruding lobes of the substantially cylindrical bore 210 are the portions where the mantle moves away from the original cylindrical outline (shown in dotted lines) and these lobes form the non-interfering segments 230 of the substantially cylindrical bore 210. Conversely, the portions between the lobes (the dents or inwardly extending recesses in the cylinder) have functional threading, and form the threaded segments 220 of the substantially cylindrical bore 210.

Figure 6D:
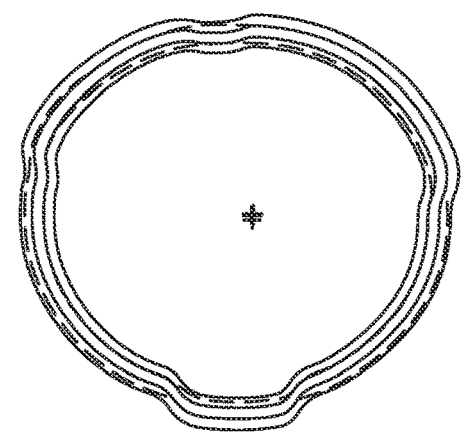
FIGS. 6A to 6D schematically illustrate the mechanical engagement process in an embodiment of the system according to the present invention.
Figure 6C:
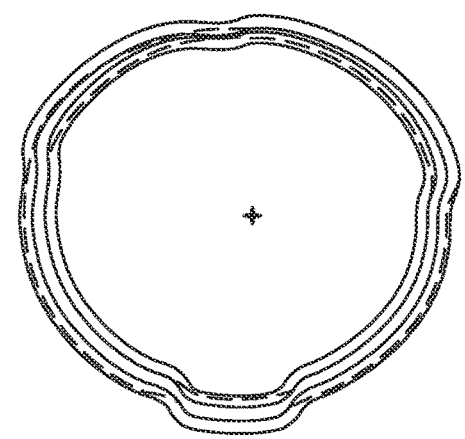
Figure 6B:
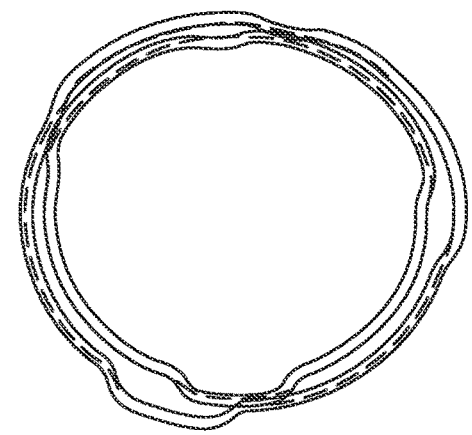
Figure 6A:
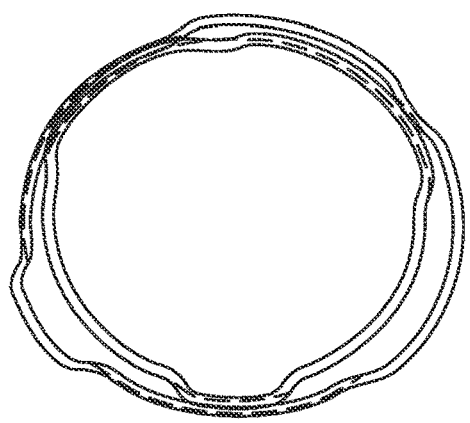

FIGS. 6A to 6D schematically illustrate the engagement process between the end cap 200 and connector 100. In FIG. 6A, the substantially cylindrical bore 210 is slid over the substantially cylindrical protrusion 110 by choosing a relative angular orientation in which the non-interfering segments 230 of the bore 210 are aligned with the threaded segments 120 of the connector 100.

During the sliding movement, the bore 210 and the protrusion 110 need not be perfectly coaxial, in fact, some degree or a little eccentricity of the bore 210 may facilitate the sliding between the components. The initiating of the rotating movement will tend to recenter the bore 210 relative to the protrusion 110, so as to arrive at situation shown at FIG. 6B.

In situation shown at FIG. 6C, the bore 210 has been rotated over approximately 20° in the direction of engagement. Threaded segments 220 of the bore 210 have begun to engage with threaded segments 120 of the protrusion 110.

In situation shown at FIG. 6D, the bore 210 has been rotated over approximately 60° in the direction of engagement. Threaded segments 220 of the bore 210 have fully engaged with threaded segments 120 of the protrusion 110.

As shown in FIGS. 4-6, the lobes of the connector may be arranged so as to present no rotational symmetry, thus forcing the installation of the fluid filter element to occur under a specific angular orientation. As the lobes are visible on the outside of the protrusion 110 and at the open end of the end cap 200, it is easy for the end user to see how the fluid filter element must be held in order to fit onto the connector 100.

It should be noted that the circumferential lobes may be arranged so as to present diametral symmetry.

Figure 7:
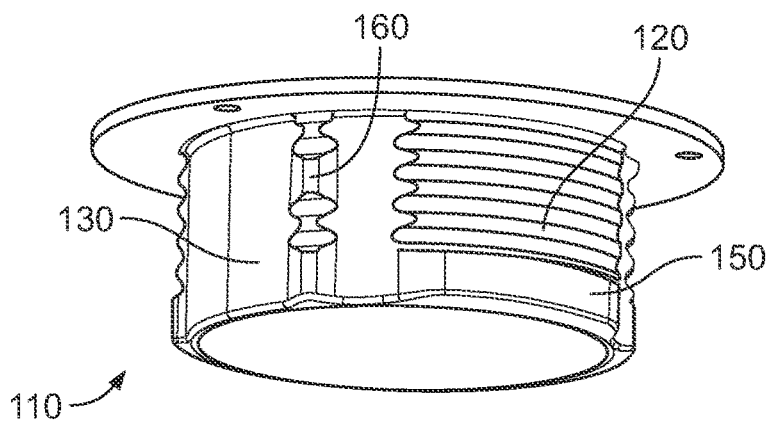
FIG. 7 illustrates further features of an embodiment of the system according to the present invention.

As illustrated in FIG. 7, the threaded segments 120 of the substantially cylindrical protrusion 110 are preferably provided at their protruding end with a length of unthreaded mantle 150 having a diameter corresponding to (preferably not inferior to, or superior to) the major diameter of the threaded segments 120 and a length exceeding the thread pitch of the threaded segments 120, so as to inhibit the screwing on of an element presenting a thread in the axial range defined by the length of unthreaded mantle.

The effect of the length of unthreaded mantle 150 is twofold. On the one hand, it avoids inadvertently screwing an old fluid filter element (with a continuous thread) onto a connector of the system according to the present invention. On the other hand, it forces the substantially threaded bore 210 to be slid far enough up the protrusion 110 before the bayonet-type engagement can be initiated. In this way, it can be ensured that the top of the end cap 200 effectively ends up against the flange of the connector 100 at the end of the engagement rotation, thereby compressing any seal that may be provided there.

It must be noted that in embodiments where the connector 100 is provided with a substantially cylindrical bore and the end cap 200 of the filter element comprises a substantially cylindrical protrusion presenting an outer threading pattern composed of a number of threaded segments interrupted by non-threaded segments, the length of unthreaded mantle 150 should still be provided on the connector 100. In such cases, after the substantially cylindrical protrusion of the end cap 200 has been slid sufficiently far into the substantially cylindrical bore of the connector 100, the threaded segments in the substantially cylindrical bore of the connector 100 can be made to engage with the threaded segments 120 of the substantially cylindrical protrusion of the end cap 200 by turning the end cap 200 over the required angle (e.g., approximately 60° in the direction indicated by the arrow as shown in FIG. 3 for the reverse embodiment).

Figure 8:
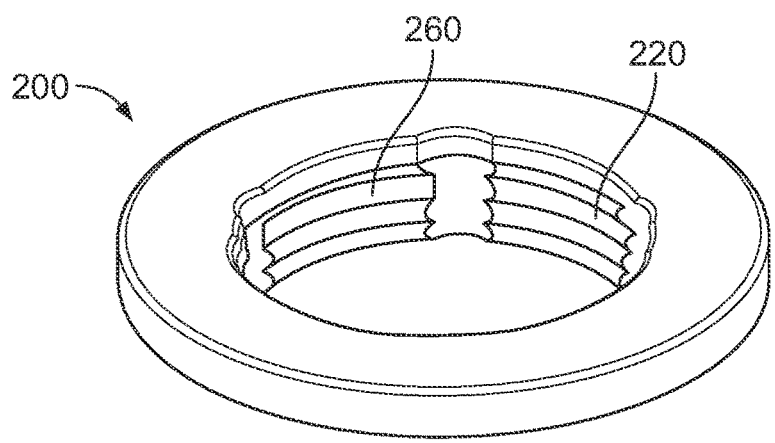
FIG. 8 illustrates further features of an embodiment of the system according to the present invention.

An additional protection against back-rotation 160, 260 may be provided to avoid rotating the end cap in the wrong direction. FIG. 7 illustrates a narrow threaded segment in which a single thread groove has been skipped so as to leave a ridge 160. In FIG. 8, a ridge or wedge 260 can be seen in a corresponding position of the end cap 200. Both elements 160, 260 are positioned so as to ensure that rotation is only allowed in one direction.

Figure 9:
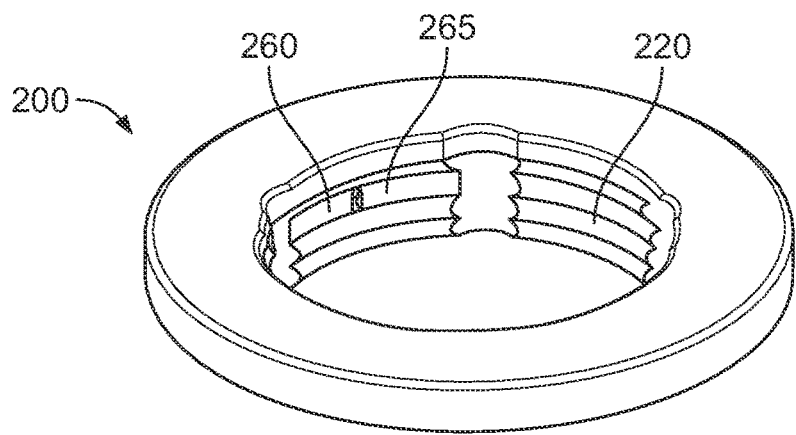
FIG. 9 illustrates further features of an embodiment of the system according to the present invention.
Figure 10A:
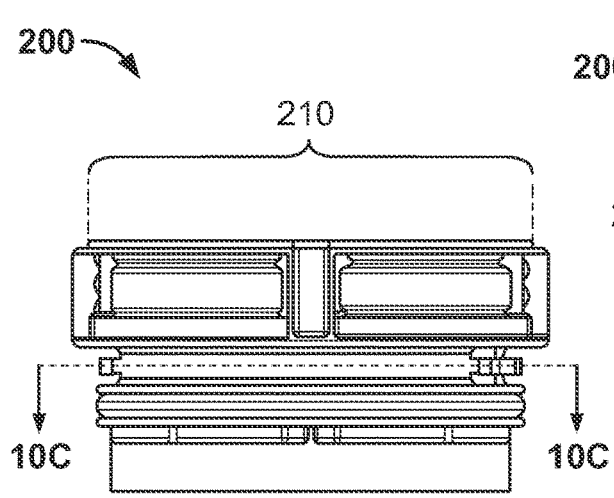
FIGS. 10-15 illustrate another embodiment of the system according to the present invention.
Figure 10D:
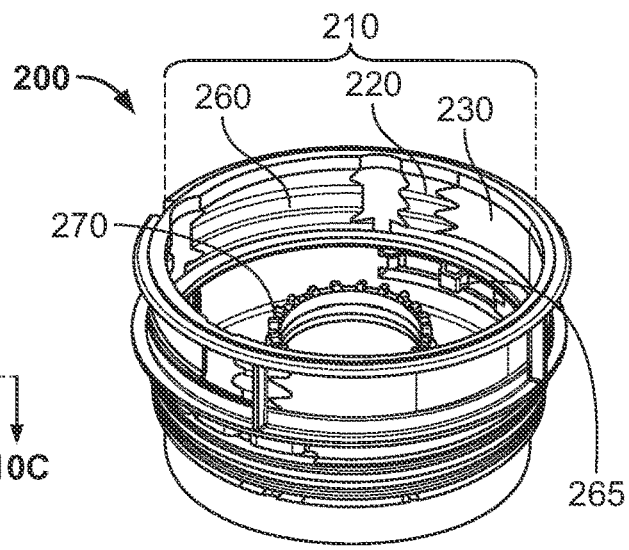
Figure 10B:
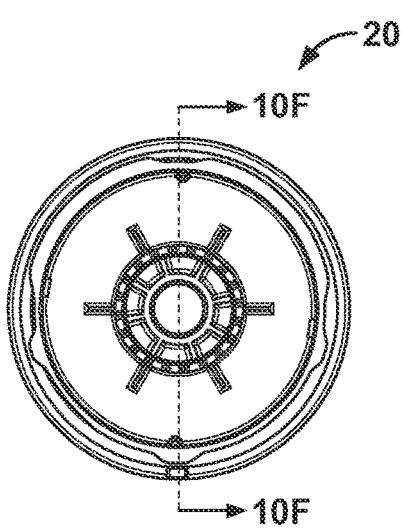
Figure 10E:
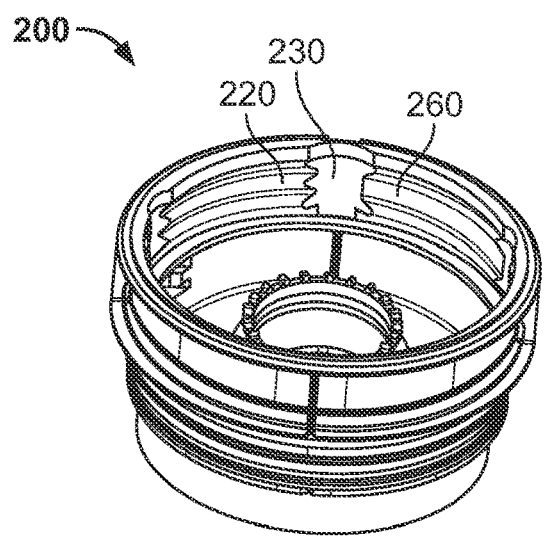
Figure 10C:
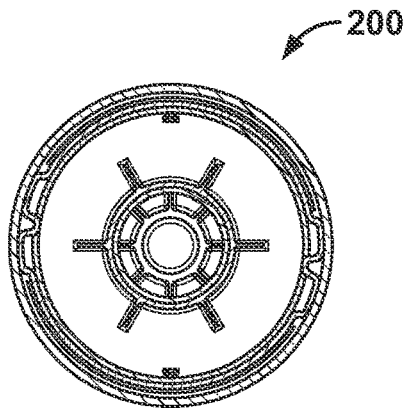
Figure 10F:
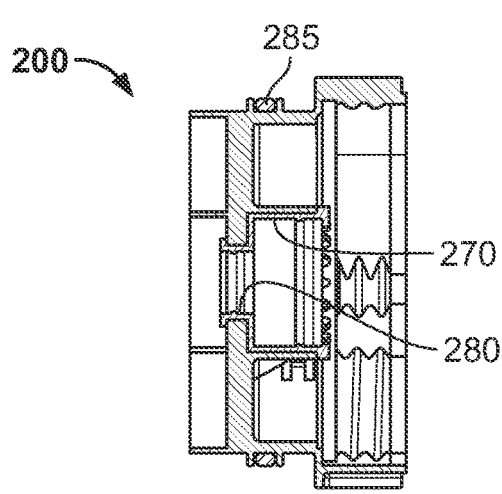
Figure 11A:
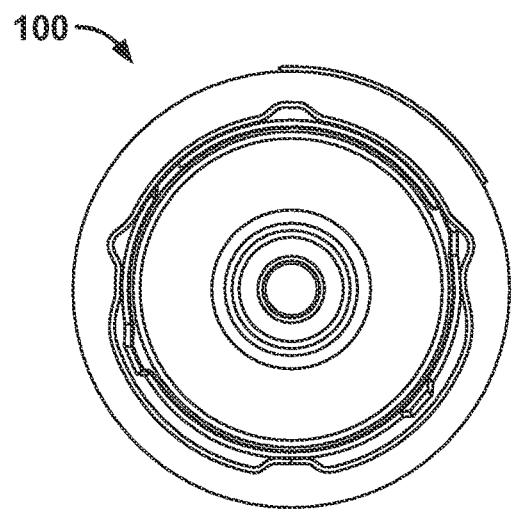
Figure 11B:
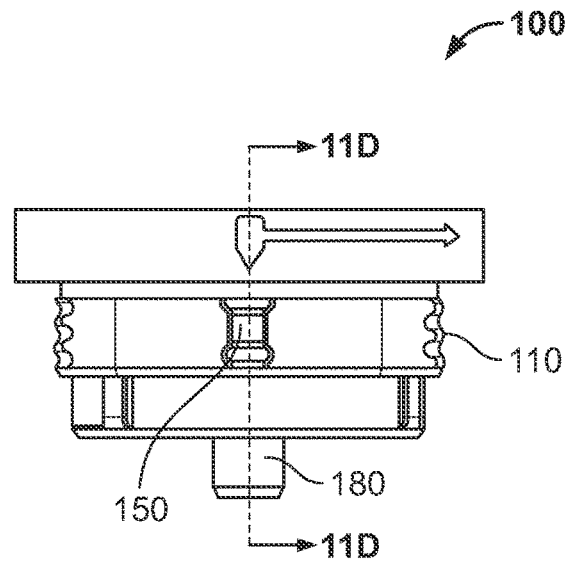
Figure 11C:
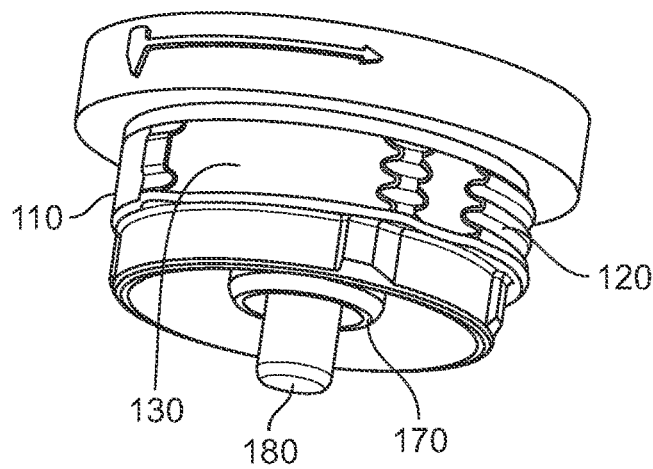
Figure 11D:
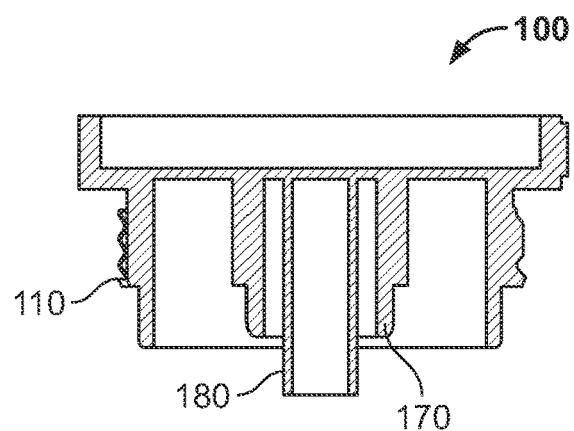

As shown in FIG. 9, the ridge or wedge 260 may be provided with a flexible finger 265 that, in combination with the ridge 160 of the protrusion, form a snap-fit lock. It is an additional advantage of this arrangement that the user hears and/or feels a "click" as the snap-fit lock 160, 260 engages, which signals the fact that a sufficiently tight engagement has been achieved, whereby the seal is compressed. The snap-fit lock 160, 260 is preferably designed in such a way that it can be disengaged by manual rotational force.

Referring back to FIG. 3, the present invention also pertains to a fluid filter element for use in the fluid filter system as described above, the fluid filter element comprising an end cap 200 adapted to be coupled to the connector 100 mounted on a machine so as to allow fluid to be exchanged between the filter element and the machine, wherein the end cap 200 is provided with the cylindrical bore 210 presenting an inner threading pattern composed of a number of threaded segments 220 interrupted by non-interfering segments 230, the non-interfering segments 230 remaining outside the space defined by the major diameter of the threaded segments 220; wherein the non-interfering segments 230 are distributed along the circumference of the cylindrical bore 210 so as to provide no rotational symmetry.

The fluid filter element may further comprise a filter medium arranged around and/or inside an axial liner, wherein the end cap 200 is attached to or of one part with the liner.

The presence of a rigid liner allows the end user to exert the necessary torque to the distal end of the liner. The distal end of the liner (or the second end cap provided there) may be provided for this purpose with an element that can easily be gripped with a wrench, such as a hexagonal protrusion.

The invention also pertains to a process for producing a filter element as described above, the process comprising:
 pressing a metal disc with a mandrel in one or more steps so as to obtain a first end cap 200 with a bore 210;
 press rolling the first end cap with a threaded mandrel or laterally pressing the first end cap with a threaded die so as to provide the first end cap 200 with a continuous or segmented inner thread; and
 assembling the first end cap 200 with a liner, a filter medium, and a second end cap so as to obtain the air filter element;
wherein the pressing of the metal disc results in a substantially cylindrical shape having a number of lobes that, after the press rolling or lateral pressing step, form the non-interfering segments 230, while a remainder of the shape form the threaded segments 220.

Depending on the arrangement of the threaded mandrel or the threaded die, the process described above may result in a semi-symmetrical cylinder shape or a substantially symmetrical shape. A substantially symmetrical shape may be preferred from a manufacturing point of view, because it can be obtained with a set of partial dies (e.g. 4 dies) that are subject to a substantially equal load during the press rolling step. When a semi-cylindrical shape is used, the operator can recognize the correct orientation for insertion and locking of the fluid filter element from the shape itself (e.g. by recognizing a particular axis in a semi-symmetrical arrangement). When a substantially symmetrical cylinder shape is used, graphical indicators such as arrows and lock symbols may be provided to aid the user in correctly aligning the fluid filter element prior to insertion, and correctly rotating it to achieve an adequate lock.

FIGS. 10-15 illustrate another embodiment of the system according to the present invention and its parts. This embodiment may, for example, be used in the context of oil filtration.

FIGS. 10A to 10F present a top view, a front view, cross-sections, and perspectives of an end cap 200, for example made of plastic, provided with a substantially cylindrical bore 210 presenting an inner threading pattern composed of a number of threaded segments 220 interrupted by non-interfering segments 230. The non-interfering segments 230 remain outside the space defined by the major diameter of the threaded segments 220. The non-interfering segments 230 are distributed along the circumference of the cylindrical bore 210 so as to provide no rotational symmetry.

A single thread groove has been skipped to create a ridge 260, to avoid rotating the end cap in the wrong direction. A flexible finger 265 is provided to engage with a corresponding ridge on the protrusion on the connector. In contrast to the embodiment of FIG. 9, the flexible finger 265 of this embodiment is provided separately from the ridge 260. In the illustrated embodiment, the snap-fit is provided in a longitudinal zone that is without thread, to facilitate manufacturing; in other embodiments, this feature may be provided in the longitudinal zone that has threading.

The end cap 200 is connected to an inner part, preferably made of plastic, the top surface of which acts as a grommet 270 that engages with a corresponding surface on the system inlet when the fluid filter element is coupled to the system. Preferably, the grommet is provided with some bumps, protrusions, or catches that ensure the grommet's resistance to rotation under the influence of the vibrations that may be expected to occur in an engine environment. The lower portion of the inner part forms a tube-shaped outlet channel 280.

The lower part of the end cap 200 presents a circumferential groove to accommodate an O-ring 285 to sealingly engage with the housing (canister) of a fluid filter element onto which the end cap 200 is mounted (see FIGS. 13A-13D and 14A-14C).

FIGS. 11A to 11D present a top view, a front view, cross-sections, and perspectives of a corresponding embodiment of the connector 100 according to the present invention. The connector 100 comprises a substantially cylindrical protrusion 110 presenting an outer threading pattern composed of a number of threaded segments 120 interrupted by non-threaded segments 130. A length of unthreaded mantle 150 having a diameter corresponding to (preferably not inferior to, or superior to) the major diameter of the threaded segments 120 and a length exceeding the thread pitch of the threaded segments 120, is provided to inhibit the screwing on of an element presenting a thread in the axial range defined by the length of unthreaded mantle. An inlet tube 180 is provided, which, during installation of the fluid filter element, is received in the tube-shaped outlet channel 280. Upon completion of the coupling process, the grommet 270 of the fluid filter element engages with the surface 170.

Figure 12A:
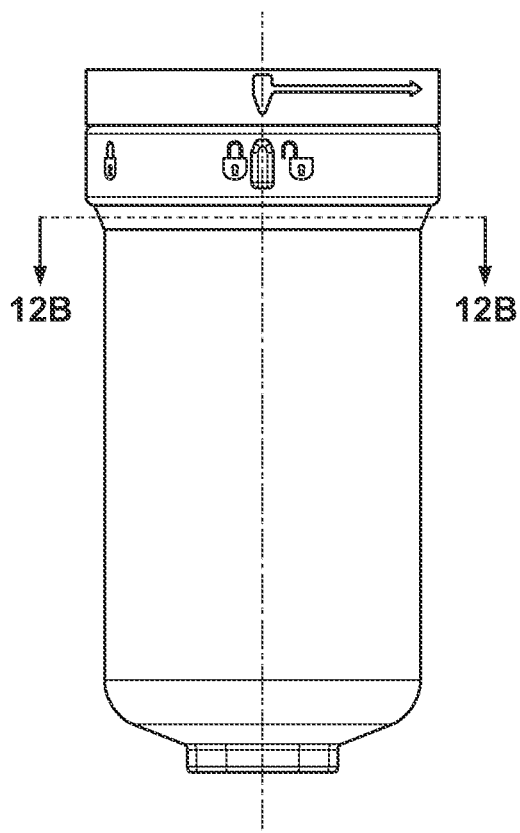
Figure 12C:
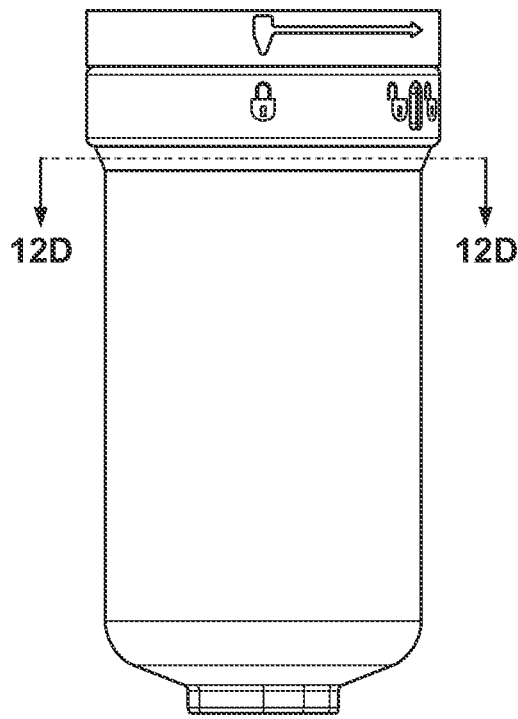
Figure 12B:
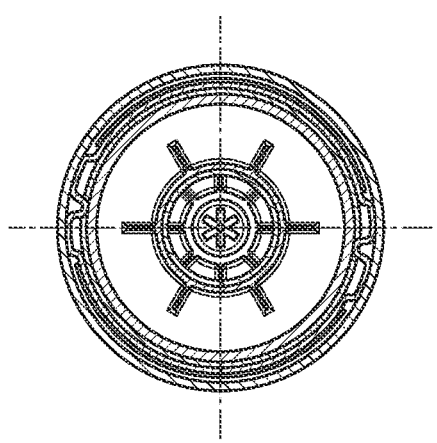
Figure 12D:
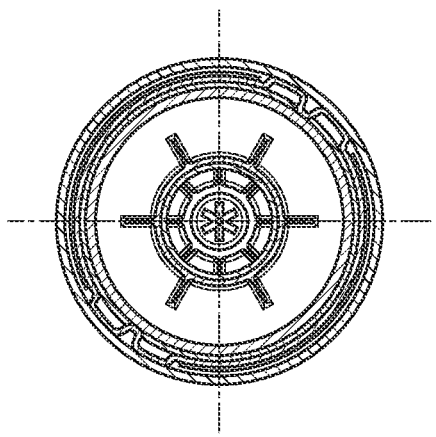
Figure 13A:
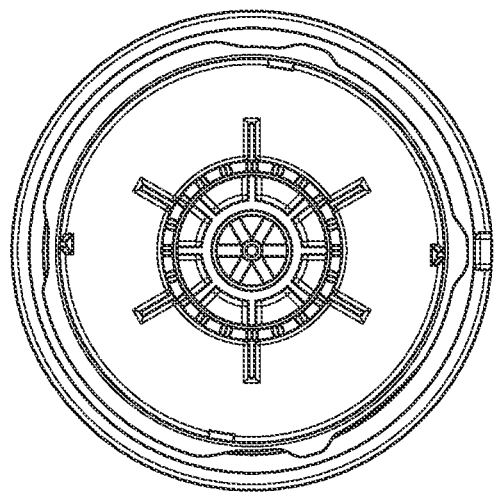
Figure 13B:
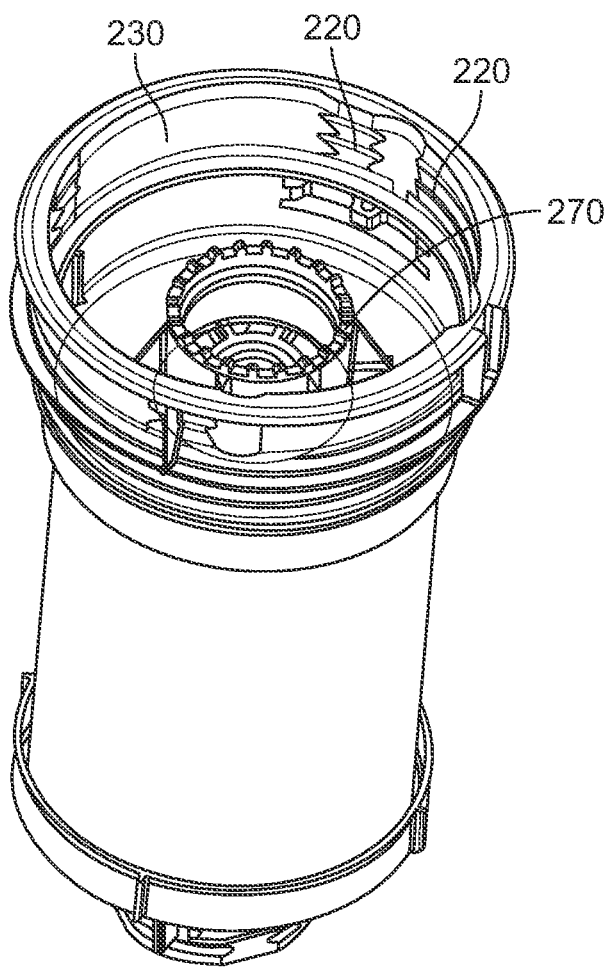
Figure 13C:
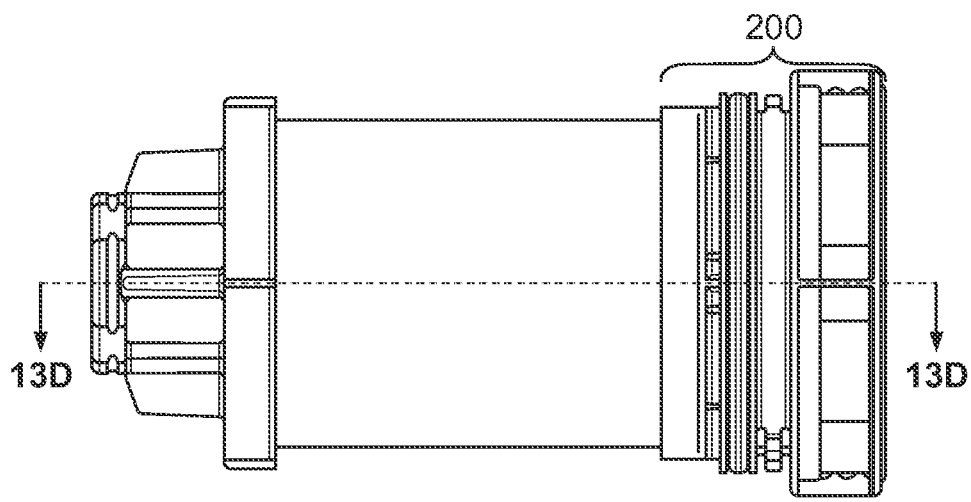
Figure 13D:
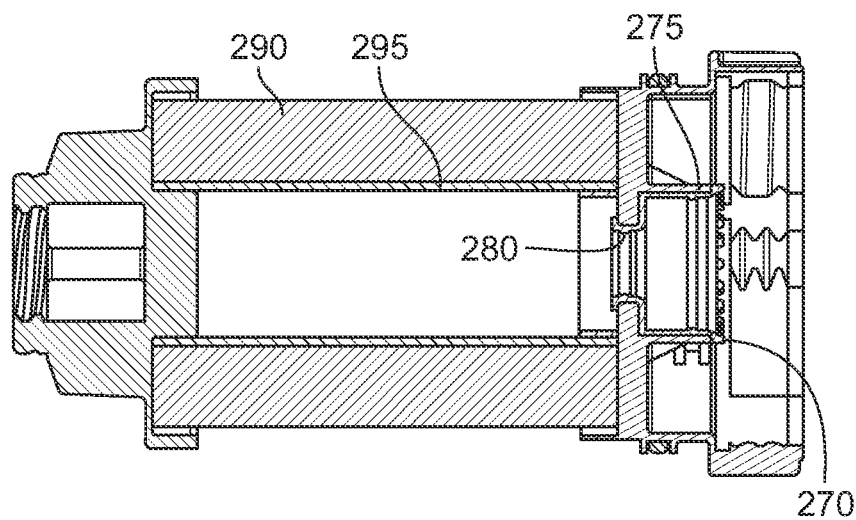
Figures 14A, 14B:
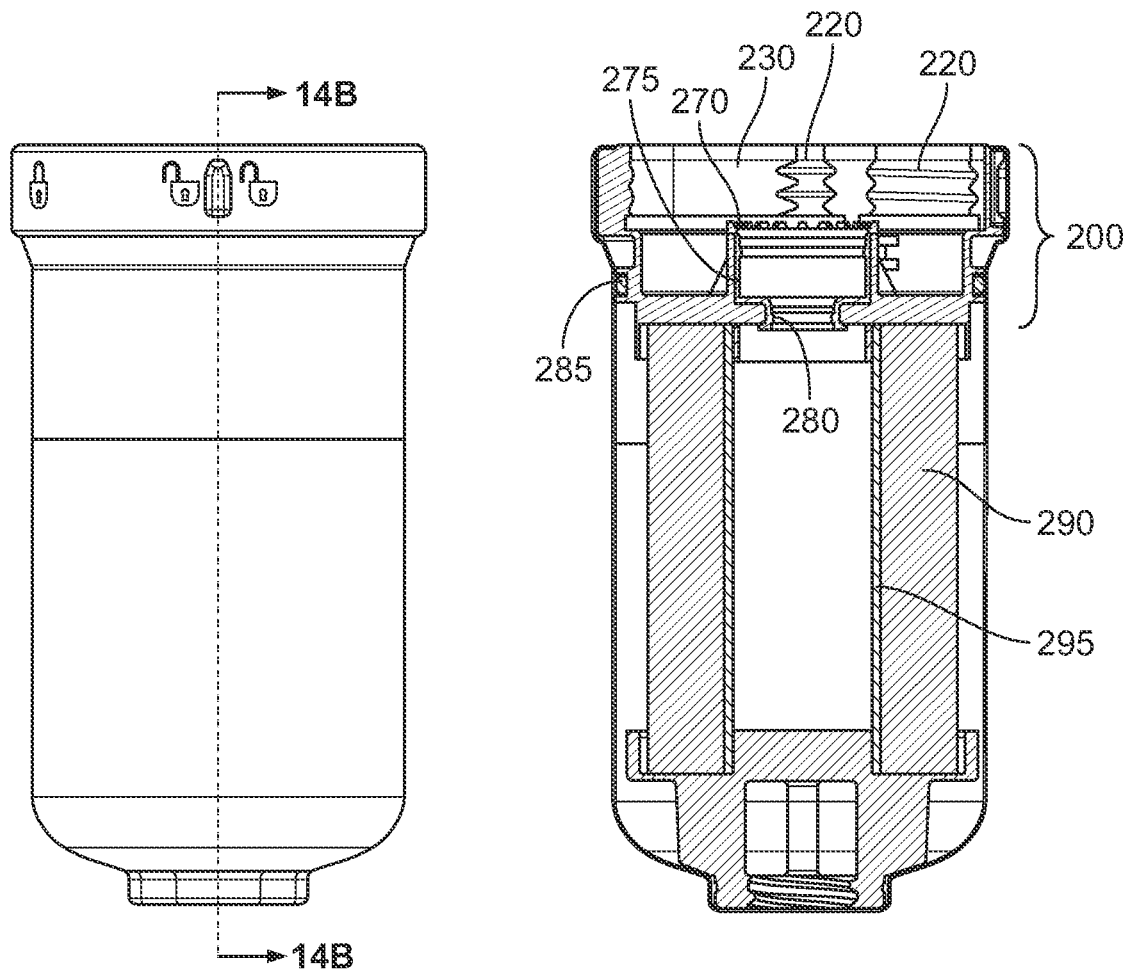

FIGS. 12A-12D illustrate the relative positions of the filter fluid element with end cap 200 and the system with connector 100 during insertion (FIGS. 12A-12B) and after full rotational engagement (FIGS. 12C-12D). Graphical indicators such as arrows and lock symbols aid the user in correctly aligning the fluid filter element prior to insertion, and correctly rotating it to achieve an adequate lock. As these symbols unambiguously identify the correct orientation for insertion and locking, the threaded parts no longer have to be shaped in such a way that the operator can recognize the correct orientation from the shape itself (e.g. by recognizing a particular axis in a semi-symmetrical arrangement).

FIGS. 13A-13D and 14A-14C illustrate an embodiment of a fluid filter element for use in the system of the present invention. A filtration medium 290, such as a pleated medium, is arranged around an axial liner 295, having an end cap 200 as described above attached to it.

The end cap 200 of the filter element may be substantially made of plastic. The fluid filter element may be assembled by sliding a part of the metal canister housing the filter medium 290 over it and folding it inwards. At that point, the O-ring 285 of the end cap 200 sealingly engages with the canister. The assembly may be secured against relative rotation of the parts, for example by making a dent in the sheet metal of the canister that catches into the plastic of the end cap 200.

The end cap 200 is adapted to be coupled to the connector 100 mounted on a machine so as to allow fluid to be exchanged between the filter element and the machine. The end cap 200 is provided with the cylindrical bore 210 presenting an inner threading pattern as described above in connection with FIG. 10.

The end cap 200 may be combined with an inner part 275 to form an end cap assembly. The inner part 275 of the end cap assembly, preferably made of plastic, has a preferably toothed top surface 270 acting as a grommet that engages with a corresponding surface 170 on the system inlet when the fluid filter element is coupled to the system. The lower portion 280 of the inner part 275 forms a tube-shaped outlet channel, communicating with the inner cavity of the axial liner 295, which delimits the clean side of the filter medium 290.

Figure 15B:
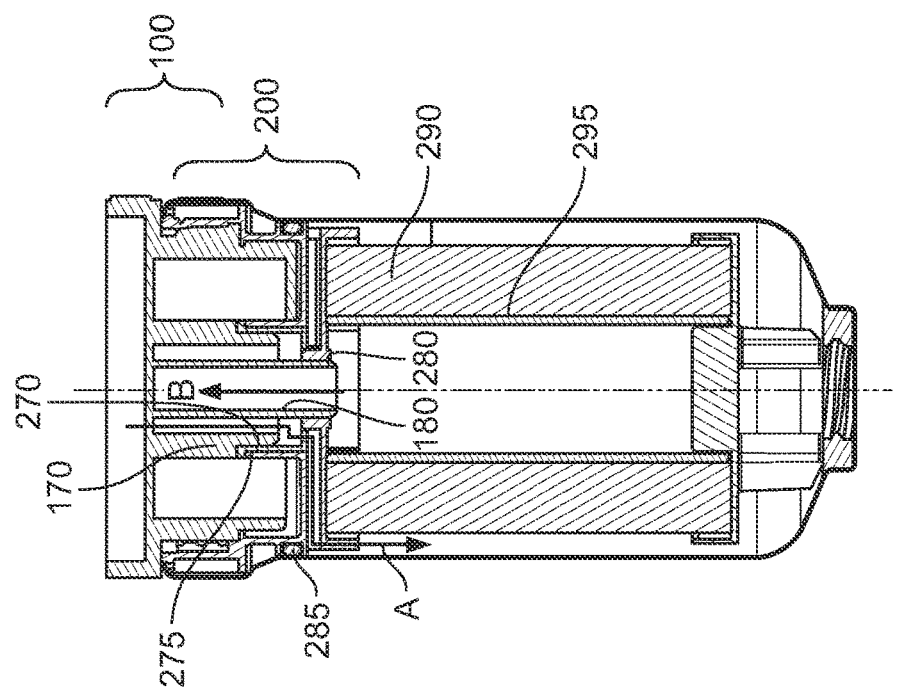
Figure 15A:
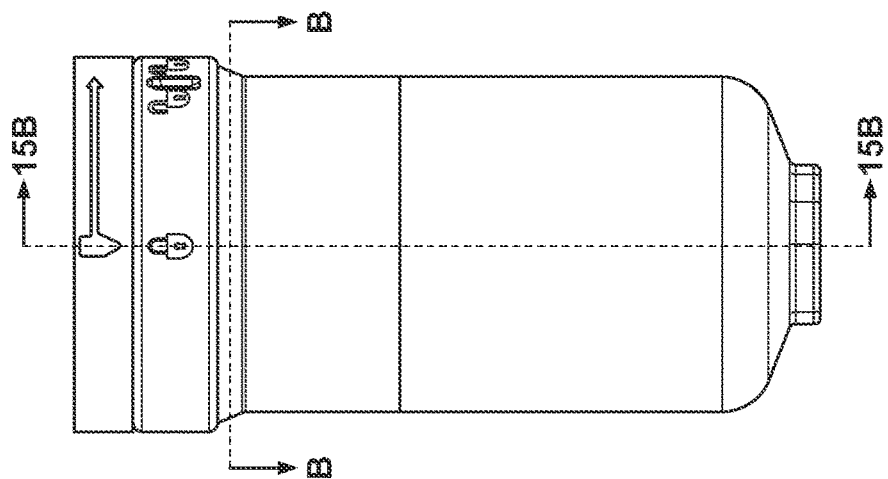
Figure 14C:
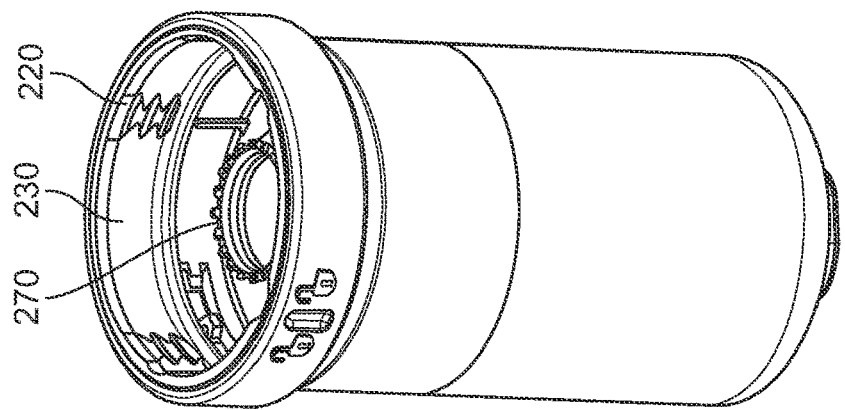

FIG. 15 illustrates an embodiment of a fluid filter element with end cap 200 and the system with connector 100 after full rotational engagement (cfr. FIG. 12C-D, right-hand figure). A filtration medium 290, such as a pleated medium, is arranged around an axial liner 295, having an end cap 200 as described above attached to it.

The end cap 200 is coupled to the connector 100 mounted on a machine so as to allow fluid to be exchanged between the filter element and the machine. The end cap 200 is provided with the cylindrical bore 210 presenting an inner threading pattern as described above in connection with FIG. 10.

The end cap 200 is combined with an inner part 275 as described above in connection with FIGS. 13 and 14, which may for example be overmolded or mechanically secured. The top surface 270 acts as a grommet that axially engages with the corresponding surface 170 on the system inlet. Bumps or teeth on top of the grommet 270 prevent loosening of the grommet under the influence of the vibrations that occur in a typical machine environment. The grommet has two sealing regions to separate the "clean" fluid side from the "dirty" fluid side.

Bold arrows schematically illustrate the flow of "dirty" fluid (arrow A) and of "clean" fluid (arrow B). The "dirty" fluid (arrow A) passes through special horizontal flow channels below the sealing area with the canister to guide the central incoming flow to the outside of the media.

As can be seen, the lower portion 280 of the inner part 275 forms a tube-shaped outlet channel, communicating with the inner cavity of the axial liner 295, which delimits the clean side of the filter medium 290, and sealingly receiving the central inlet tube 180 of the connector 100.

The configuration of the seals described above has the advantage that any liquids present in the canister prior to servicing will remain in the canister when the filter element is removed for servicing.

In variants of the illustrated embodiment, the part above the O-ring 285 of the endcap 200 can be shortened by decreasing the number of thread cycles and/or including the snap fit system in the thread region.

While the invention has been described hereinabove with reference to particular embodiments, this was done to clarify and not to limit the invention, the scope of which is to be determined by reference to the accompanying claims. In particular, features that have been described as pertaining to the fluid filter element, in particular to the substantially cylindrical bore, may be applied with the same technical effects and advantages to the connector, if it is the connector that is provided with a bore and the fluid filter element that is provided with a protrusion. Conversely, features that have been described as pertaining to the connector, in particular to the substantially cylindrical protrusion, may be applied with the same technical effects and advantages to the fluid filter element, if it is the fluid filter element that is provided with a protrusion and the connector that is provided with a bore.

The invention claimed is:

1. A system comprising:
a connector and a fluid filter element, wherein the connector is for coupling to the fluid filter element, the fluid filter element comprising an end cap provided with a first coupling means, and the connector comprising a second coupling means;
wherein said first coupling means comprises a substantially cylindrical bore presenting an inner threading pattern composed of a number of threaded segments interrupted by non-interfering segments, and said second coupling means comprises a substantially cylindrical protrusion presenting an outer threading pattern composed of a number of threaded segments interrupted by non-threaded segments, or vice versa, wherein the substantially cylindrical protrusion is provided with a plurality of circumferential lobes forming said threaded segments, and wherein the threaded segments and the plurality of circumferential lobes are arranged so as to present no rotational symmetry such that the second coupling means can only be received by the first coupling means in a single angular orientation corresponding to a first relative rotational position between the substantially cylindrical bore and protrusion;
wherein said non-threaded segments are distributed along the circumference of said cylindrical protrusion so as to only allow said substantially cylindrical bore to slide over said substantially cylindrical protrusion without interference between said circumferential lobes and threaded segments of said substantially cylindrical protrusion and said threaded segments of said substantially cylindrical bore when said substantially cylindrical bore and said substantially cylindrical protrusion are in the first relative rotational position; and wherein said threaded segments of said substantially cylindrical protrusion are arranged to allow engagement with said threaded segments of said substantially cylindrical bore, when said substantially cylindrical bore has been slid over said substantially cylindrical protrusion, by means of a rotation.

2. The system of claim 1, wherein said first coupling means comprises a substantially cylindrical protrusion presenting an outer threading pattern composed of a number of threaded segments interrupted by non-threaded segments, and said second coupling means comprises a substantially cylindrical bore presenting an inner threading pattern composed of a number of threaded segments interrupted by non-interfering segments.

3. The system of claim 1, wherein said threaded segments of said substantially cylindrical protrusion are provided at a protruding end with a length of unthreaded mantle having a diameter corresponding to a major diameter of said threaded segments and a length exceeding a thread pitch of said threaded segments, so as to inhibit screwing on of an element presenting a thread in an axial range defined by said length of unthreaded mantle.

4. The system of claim 1, wherein said first coupling means is detachably engaged with said second coupling means.

5. The system of claim 1, wherein the substantially cylindrical protrusion includes, at an end received by the first coupling means, a length of unthreaded mantle having a diameter corresponding to a major diameter of the threaded segments of the second coupling means.

6. The system of claim 1, wherein, when the substantially cylindrical bore and the substantially cylindrical protrusion are in the single angular orientation, the first coupling means is rotatable with respect to the second coupling means in only a single direction.

7. The system of claim 1, wherein the first coupling means and the second coupling means can be rotationally engaged from the single angular orientation to a fully engaged position, wherein further rotation is prevented, in a rotational angle of 180 degrees or less.

8. The system of claim 1, further including a lock feature for retaining the first and second coupling means in an engaged position.

\* \* \* \* \*